J. W. JACOBSON.
GREASE CUP AND MEANS FOR FILLING THE SAME.
APPLICATION FILED FEB. 7, 1916.
1,186,200.
Patented June 6, 1916.
2 SHEETS—SHEET 1.
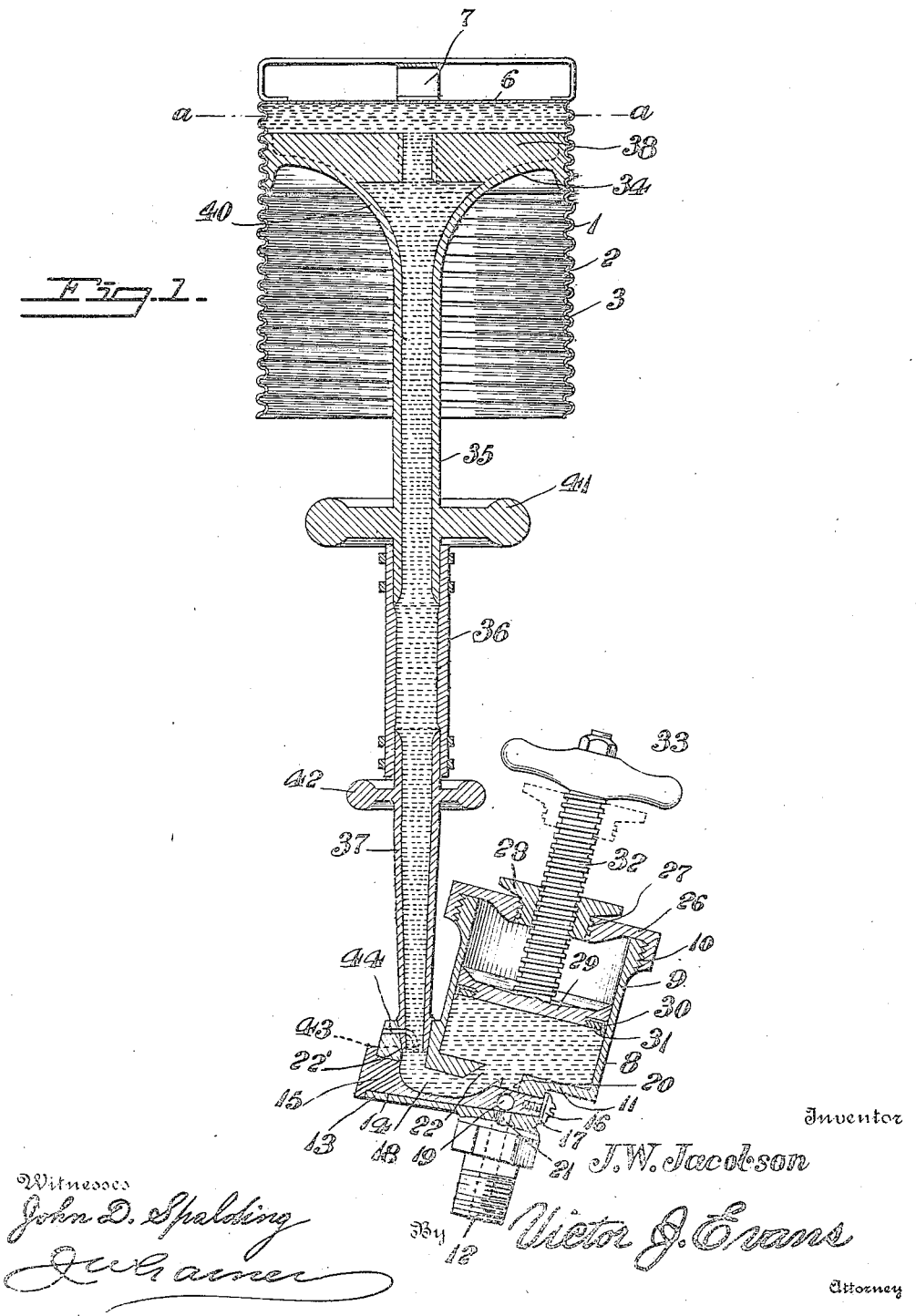

J. W. JACOBSON.
GREASE CUP AND MEANS FOR FILLING THE SAME.
APPLICATION FILED FEB. 7, 1916.
1,186,200. Patented June 6, 1916.
2 SHEETS—SHEET 2.
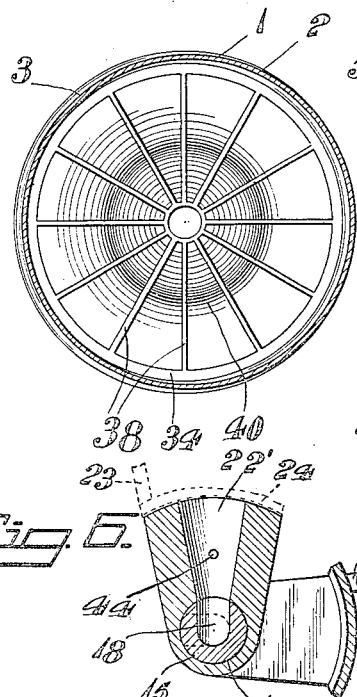
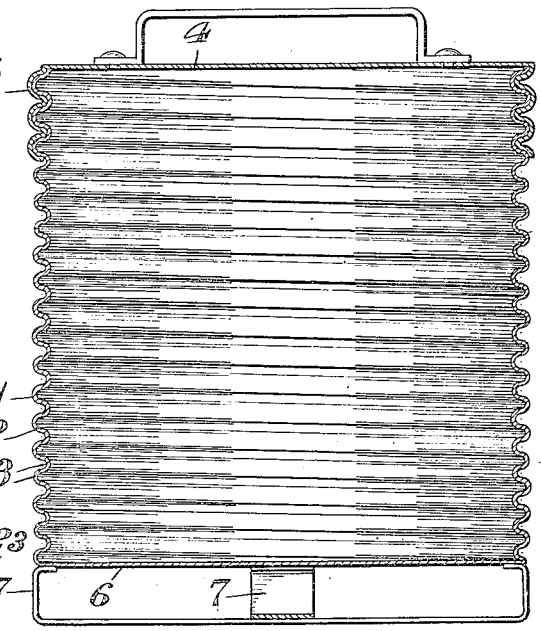
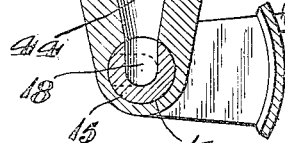
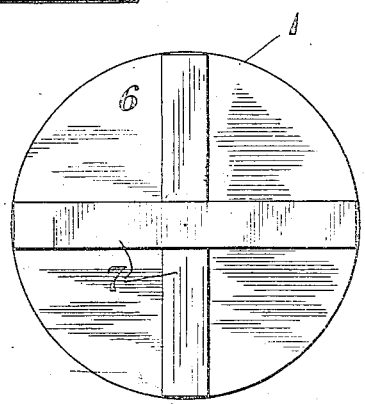
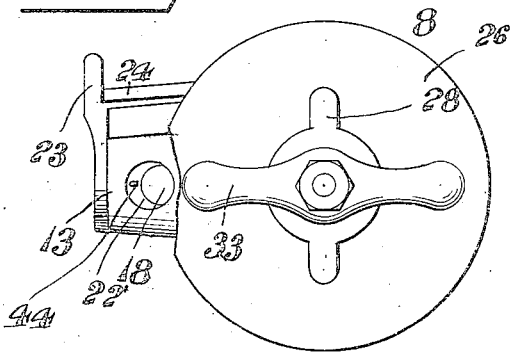
Inventor
J. W. Jacobson
Witnesses
John D. Spalding
By Victor J. Evans
Attorney

UNITED STATES PATENT OFFICE.

JACOB W. JACOBSON, OF HANCOCK, MICHIGAN.

GREASE-CUP AND MEANS FOR FILLING THE SAME.

1,186,200.

Specification of Letters Patent.

Patented June 6, 1916.

Application filed February 7, 1916. Serial No. 76,810.

*To all whom it may concern:*

Be it known that I, JACOB W. JACOBSON, a citizen of the United States, residing at Hancock, in the county of Houghton and State of Michigan, have invented new and useful Improvements in Grease-Cups and Means for Filling the Same, of which the following is a specification.

This invention relates to improvements in grease cup lubricators and grease guns, or means for keeping the grease cup supplied with lubricant, the invention embodying an ordinary container for the grease and means for attachment to the container and to the grease cup to force the grease from the container to the cup and without the necessity of first opening the container, removing any of the contents thereof, or exposing the contents to the air and dirt and also without danger of soiling the hands while filling the grease cup from the container.

The invention consists in the construction, combination, and arrangement of devices, hereinafter described and claimed, reference being had to the accompanying drawings, in which:

Figure 1 is a vertical sectional view of a grease cup, a container and means for transferring lubricant from the container to the grease cup and constructed in accordance with my invention, showing the same in operative relation. Fig. 2 is a sectional view of the container on the plane indicated by the line a—a of Fig. 1 and showing the extractor scraper in plan. Fig. 3 is a detail sectional view of the container with its cover and base attached. Fig. 4 is a detail inverted plan of the container base. Fig. 5 is a detail plan of the cup and showing the valve. Fig. 6 is a detail sectional view of the valve.

In the embodiment of my invention, I provide a container 1 for the grease or lubricant and in which the same is packed, shipped, and placed upon the market. The container comprises a cylindrical wall 2, made of sheet metal, and which is spirally threaded as at 3 by rolling or pressing the same, the spiral thread extending from the upper end of the wall to the lower end thereof. A cover 4 is provided for the container, which cover has a spirally threaded flange or apron 5 adapting the cover to be screwed on the upper end of the container. The base 6 of the container is circular, forms a permanent closure for one end of the container, and is provided with projections 7.

The grease cup 8 has a cylindrical wall 9 which is exteriorly threaded at the upper end as at 10 and is provided with a bottom or base 11 which has the usual downwardly extending threaded stem 12 for attaching the cup to a bearing or other machine element and the said base has an extension 13 at one side and is provided with a transverse tapered bore 14. A tapered valve plug 15 is mounted in the bore and is provided at its smaller end with a securing screw 16 and washer 17. The valve plug is provided in one side with a channel 18 and also has a transverse bore 19 and a bore 20 at right angles to and communicating with the bore 19, said bores 19 and 20 being coincident with the bore 21 which extends through the center of the base and of the stem 12. The base is provided with a bore or channel 22 leading to the interior of the cup from the inner end of the channel 18 and the extension of the base is provided with a downwardly tapered socket bore 22' to communicate with the outer end of the valve plug channel 18. At the outer end of the valve plug channel is a lever arm 23 to enable the valve plug to be turned and said lever arm has a cover 24 attached thereto which when the valve plug is turned to close the cut-off bore 20, and arrange the bore 19 in line with the bore 20 and thereby provide for the passage of lubricant from the grease cup to the bearing or machine element, closes the upper end of the socket bore 22'. When the valve plug is turned to open the upper end of the socket bore, the bore 19 will be arranged at right angles to and cut off in the bore 21 so that no grease can pass from the cup to the bearing or other machine element.

A cap 26 is threaded on the upper end of the grease cup and has a threaded central opening 27 in which a nut 28 is threaded. A piston 29 operates in the cup, has a packing 30 and retaining ring nut 31, therefor, and said piston has a threaded stem 32 which operates in a threaded bore in the center of the nut and is provided at its upper end with a knob or turning wheel 23.

The means for supplying the cup with lubricating grease from the container comprises a presser and scraper head 34 having a tubular stem 35, a connecting tube 36 coupled to the discharge end of the tubular stem 35, and a nozzle 37 coupled to the discharge end of the connecting tube and adapted to be fitted in the socket 22 of the base of the cup. The presser and scraper head comprises a circular disk exteriorly threaded for engagement in the spiral threads 3 of the container, so that the presser head can be screwed into the container after the cover has been moved from the container, the container being inverted. The presser and scraper head is also provided with radial scraper arms 38. A tubular central portion 39 connecting the inner end of the arms and said presser and scraper head is formed on its under side with a funnel shaped portion 40 which connects its outer annular wall with the upper end of the tubular stem 35. As the presser head is screwed into the container, it compresses the lubricant therein so as to force the lubricant forwardly from the container through the tubular stem 35, the connecting tube 36 and the nozzle in the lower part of the grease cup below the piston 29, the valve 13 having been first opened as will be understood. The container is turned on the presser and scraper head by grasping the base 7, the scraper arms 38 serving to scrape material from the bottom of the same and cause it to pass freely down through the funnel shaped portion and connecting tubes and nozzle to the grease cup. To enable the stem 35 and the nozzle to be held against rotation while the container is being thus screwed on the presser and scraper head, the said tubular stem 35 is provided with a hand wheel 41 and said nozzle is provided with a hand wheel 42. This construction enables lubricant to be transferred directly from the original container to the grease cup without the necessity of first having to remove any of the material from the container, without exposing the contents of the container to the air, without the possibility of any dirt or other foreign substance becoming mixed with the lubricant and without permitting air to get into the grease cup below the piston thereof. To secure the nozzle in its attached relation to the grease cup, the nozzle is provided with a bayonet slot 43 and the base of the grease cup is provided with a locking pin 44 which projects slightly into the socket 22 and coacts with the said bayonet slot as will be understood.

After the grease cup has been filled, the valve plug should be turned to arrange its outlet or discharge bore 19 in line with the bore 21 of the grease cup base, and the nozzle should be detached from the base of the grease cup, the arranging of the valve plug, causing the cover 24 to close over the socket 22.

Having described the invention, what is claimed is:

1. In combination with a grease cup, a lubricant container, a presser head screwed in the container and a duct leading from the presser head to the grease cup to cause lubricant to be transferred from the container to the grease cup through the duct when the presser head is screwed in the container, said presser head being provided with scraping devices to act on the bottom of the mass of lubricant in the container.

2. In combination with a grease cup provided with force feed means and also provided with a base having a socket and a valve to control the passage of lubricant from the socket to the cup, a container having a screw threaded cylindrical wall, a presser head adapted to be screwed in the container, a discharge tubular stem leading from the under side of the presser head, a nozzle connected to said stem and adapted to be fitted in the socket of the grease cup base.

3. In combination with a grease cup provided with force feed means and also provided with a base having a socket and a valve to control the passage of lubricant from the socket to the cup, a container having a screw threaded cylindrical wall, a presser head adapted to be screwed in the container, a discharge tubular stem leading from the under side of the presser head, a nozzle connected to said stem and adapted to be fitted in the socket of the grease cup base, said tubular stem and said nozzle having means to prevent them from being rotated.

4. In combination with a grease cup provided with force feed means and also provided with a base having a socket and a valve to control the passage of lubricant from the socket to the cup, a container having a screw threaded cylindrical wall, a presser head adapted to be screwed in the container, a nozzle connected to said stem and adapted to be fitted in the socket of the grease cup base, and a valve in the base of the grease cup and having means to close said socket, when the nozzle is detached therefrom.

In testimony whereof I affix my signature in presence of two witnesses.

JACOB W. JACOBSON.

Witnesses:
F. W. SPERR,
D. J. FRAMPTON.